(12) United States Patent
Jeon

(10) Patent No.: US 7,746,388 B2
(45) Date of Patent: Jun. 29, 2010

(54) SYSTEM AND METHOD FOR INSERTING POSITION INFORMATION INTO IMAGE

(75) Inventor: Jeong-hwan Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 11/732,531

(22) Filed: Apr. 4, 2007

(65) Prior Publication Data
US 2008/0117309 A1 May 22, 2008

(30) Foreign Application Priority Data
Nov. 16, 2006 (KR) ...................... 10-2006-0113389

(51) Int. Cl.
*H04N 5/76* (2006.01)
(52) U.S. Cl. .............................. 348/231.2; 348/231.99; 348/231.5
(58) Field of Classification Search .............. 348/207.1, 348/211.2, 211.3, 211.14, 231.99, 231.2, 348/231.5
See application file for complete search history.

(56) References Cited
U.S. PATENT DOCUMENTS

| 5,296,884 | A | * | 3/1994 | Honda et al. ................. 396/311 |
| 2001/0055373 | A1 | * | 12/2001 | Yamashita ............... 379/90.01 |
| 2006/0187317 | A1 | * | 8/2006 | Montulli et al. .......... 348/231.5 |
| 2008/0125996 | A1 | * | 5/2008 | Fitzhugh ...................... 702/89 |

\* cited by examiner

*Primary Examiner*—Kelly L Jerabek
(74) *Attorney, Agent, or Firm*—Drinker Biddle & Reath LLP

(57) ABSTRACT

A system and method for connecting a global positioning system (GPS) device with a digital image processing device and inserting position information stored in the GPS device into an image file taken by the digital image processing device are provided. The system includes: a digital image processing device that photographs an image, generates an image file and stores the same; and a GPS device that stores position information according to signals transmitted from a GPS satellite at a predetermined time interval. When the digital image processing device and the GPS device are interconnected, the digital image processing device receives position information, which corresponds to time information on an image file stored in the digital image processing device, from the GPS device and inserts the position information into the image file.

21 Claims, 9 Drawing Sheets

SYSTEM AND METHOD FOR INSERTING POSITION INFORMATION INTO IMAGE

CROSS-REFERENCE TO RELATED PATENT APPLICATIONS

This application claims the benefit of Korean Patent Application No. 10-2006-0113389, filed on Nov. 16, 2006, in the Korean Intellectual Property Office, the disclosure of which is incorporated herein in its entirety by reference.

BACKGROUND OF THE INVENTION

1. Field of the Invention

The present invention relates to a system and method for connecting a global positioning system (GPS) device with a digital image processing device. More particularly, the present invention relates to a system and method forand inserting position information stored in the GPS device into an image file stored in the digital image processing device.

2. Description of the Related Art

Various types of digital image processing devices, which photograph images and store them in digital form, are known in the art. Examples of such devices are digital cameras, camcorders, mobile phones including a camera, electronic organizers including a camera, and personal data assistants (PDAs). These digital image processing devices can be carried (e.g., during traveling, mountain climbing, etc.) and used to photograph and electronically record images of various scenes. However, conventional digital image processing devices are configured for their primary function, namely photographing, image storing, and image searching. To this end, conventional digital image-processing devices do not facilitate storing or reconciling information about a place where an image is taken or information about characteristics of the place to be stored with a stored image.

To overcome this problem, a global positioning system (GPS) is employed with a digital image processing device so that information can be stored about a place where an image is taken or information about characteristics of the place. Examples of introducing a GPS into a digital image processing device are RICOH cameras and the Sony GPS device GS-CS1K.

RICOH cameras connect to a GPS device and receive and store latitude and longitude information in an image file in real time while taking images. However, when a RICOH camera directly connects to the GPS device, it typically takes 1 to 2 minutes (or, sometimes a maximum of 5 minutes) for the GPS device to receive a GPS signal. In other words, initial time for preparing image photographing is so long that a user cannot efficiently take an image at a desired time. In an attempt to overcome the GPS delay problem, a GPS device has been combined with a camera (e.g., the RICOH 500SE). However, the size and the power consumption are increased in cameras combined with a GPS device.

A Sony GPS device known as the GS-CS1K is an external GPS device that records position information separately/independently from a digital image processing device. To insert the position information with the images, the images stored in a Sony camera are transferred to a personal computer (PC) and the position data stored in the GPS device is transferred to the PC. The PC performs a reconciliation process using specialized software by comparing information about time when an image file is photographed with time when the position information is recorded in the GPS device. When times are reconciled, the software records the position information in the image file, which is now stored on the PC. Sony GPS devices are inconvenient since special software is always needed to record position information in an image file. In addition, when time is not correctly set in a camera (i.e., when the GPS device and the camera are not suitably synchronized), incorrect position information may be recorded in an image file.

SUMMARY OF THE INVENTION

The present invention provides a system and method for inserting position information into an image. In the present system and method, image photographing by a digital image processing device and position information storing by a global positioning system (GPS) device are separately and independently performed. Subsequent to the independent storing of position information and image files, the digital image processing device and the GPS device are interconnected by a wired or wireless link, and position information stored in the GPS device is inserted into an image file that is stored in the digital image processing device.

In the present system and method for inserting position information into an image, time information of a digital image processing device and/or photographing time information in a stored image file may be corrected according to time information of a GPS device.

According to an aspect of the present invention, there is provided a system for inserting position information into an image. The system includes: a digital image processing device that photographs an image, generates an image file and stores the image file; and a GPS device that receives information transmitted from GPS satellites and stores position information at a predetermined time interval. When the digital image processing device and the GPS device are connected by a wired or wireless link, the digital image processing device receives from the GPS device the position information, which corresponds to time information on one or more image files stored in the digital image processing device, and inserts the position information into the one or more image files.

Image photographing by the digital image processing device and position information storing by the GPS device may be separately and independently performed (e.g., whether or not the digital image processing device is connected to the GPS device).

The system may further include a communication link that facilitates data communication between the digital image processing device and the GPS device via wired or wireless connection protocol.

The digital image processing device may include a timer that counts time of the digital image processing device and provides photographing time information when the image file is generated.

When a time error (i.e., a difference between time information of the timer and time information of the GPS device) exceeds a predetermined value, the time information of the timer may be corrected according to the time information of the GPS device.

When the time error between time information of the timer and time information of the GPS device exceeds the predetermined value, the time information of the timer and the photographing time information on the one or more stored image files may be corrected based on the time information of the GPS device.

A term (e.g., a range of days or times) for time correction may be selected with respect to image files stored in the digital image processing device so that photographing time information on image files corresponding to the term may be corrected based on the time error between the digital image processing device and the GPS device.

Photographing time information on image files photographed on a current day may be corrected based on the time error between the digital image processing device and the GPS device.

According to another aspect of the present invention, there is provided a method of inserting position information stored in a GPS device into an image stored in a digital image processing device. The method includes: determining whether the digital image processing device is connected to the GPS device; when the digital image processing device is connected to the GPS device, transmitting position information, which corresponds to photographing time information on a image file, from the GPS device to the digital image processing device; and inserting the position information into the image file.

The method may further include separately/independently performing image photographing of the digital image processing device and position information storing of the GPS device while, for example, the digital image processing device is not connected to the GPS device, before determining whether the digital image processing device is connected to the GPS device.

The digital image processing device and the GPS device may be connected via wired or wireless connection protocol for data communication therebetween.

The digital image processing device may include a timer that counts time of the digital image processing device and provides photographing time information when the image file is generated. In the method further steps may comprise: determining if a time error (i.e., a difference between time information of the timer and time information of the GPS device) exceeds a predetermined value; and synchronizing the digital image processing device with the GPS device by correcting time information of the timer according to the time information of the GPS device.

When the time error between time information of the timer and time information of the GPS device exceeds the predetermined value, the time information of the timer and the photographing time information on the image file may be corrected based on the time information of the GPS device.

A term (i.e., range of days or times) for time correction may be selected with respect to image files stored in the digital image processing device and photographing time information on image files corresponding to the term may be corrected based on the time error between the digital image processing device and the GPS device.

Photographing time information on image files photographed on a current day may be corrected based on the time error between the digital image processing device and the GPS device.

DETAILED DESCRIPTION OF THE EMBODIMENTS

Figure 1:
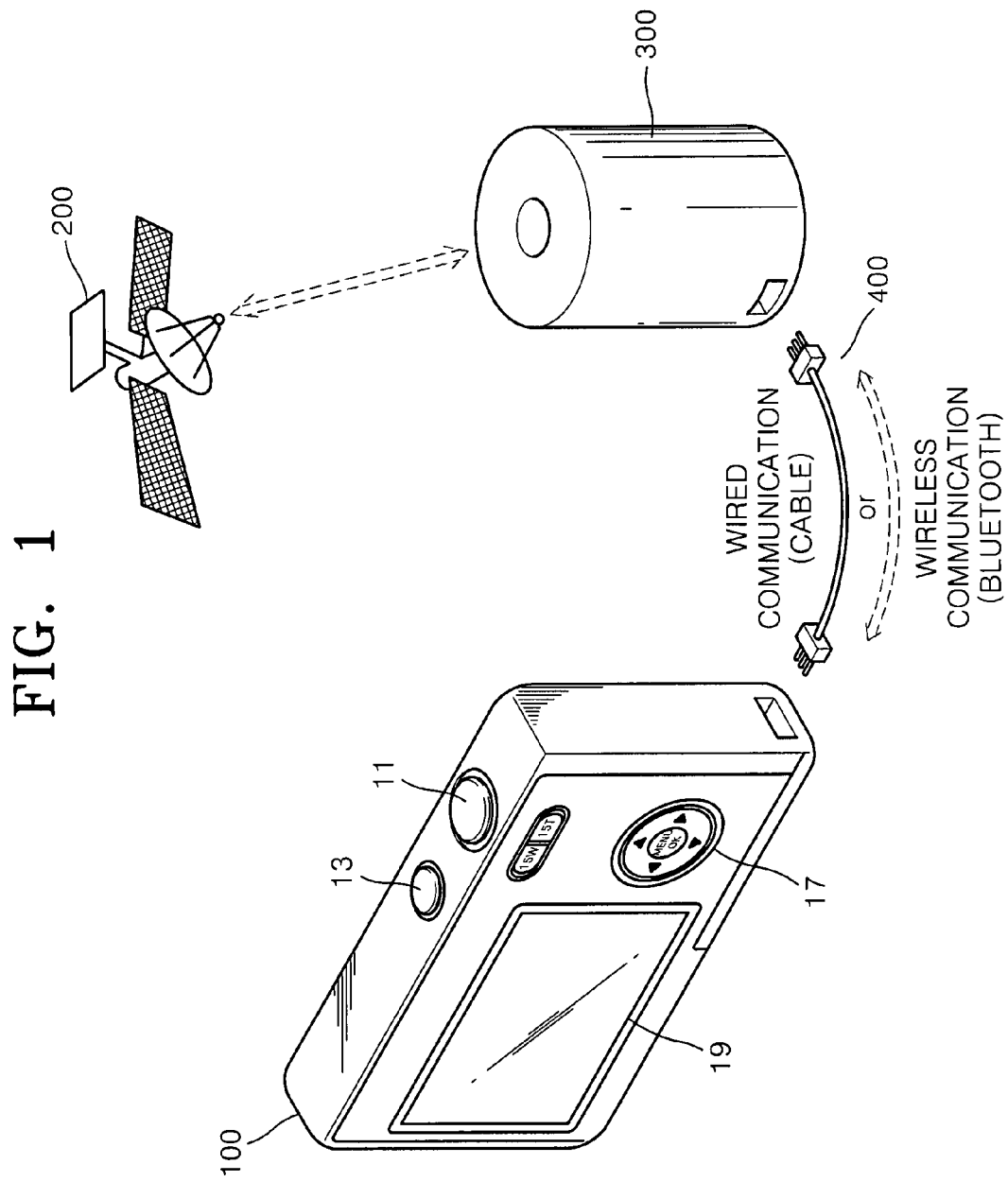
FIG. 1 illustrates an example system for inserting position information into an image according to an aspect of the present invention.

Referring now to the Figures, a system and method are provided for inserting position information into an image. FIG. 1 illustrates an example system for inserting position information into an image according to an aspect of the present invention. The system includes a digital image processing device 100, a global positioning system (GPS) satellite constellation including a plurality of satellites 200, a GPS device 300, and a communication link 400.

The digital image processing device 100 photographs an image, generates an image file and stores the image file in a storage such as a memory card, etc. As illustrated in FIG. 1, the digital image processing device 100 includes a shutter-release button 11, a power button 13, a wide angle zoom button 15W, a telephoto zoom button 15T, a function button 17, and a display unit 19.

The shutter-release button 11 is actuated by the user to expose a charge-coupled device (CCD) or a film to light for a predetermined period of time through appropriate exposure by operating an iris (not shown). The power button 13 is used to turn the digital image processing device 100 on and off. The wide angle-zoom button 15W is used to widen the angle of view and the telephoto-zoom button 15T is used to narrow the angle of view. The two buttons 15W and 15T are used to change the size of a selected exposure area. When the wide angle-zoom button 15W is actuated, the size of the selected exposure area is decreased. When the telephoto-zoom button 15T is actuated, the size of the selected exposure area is increased. The function button 17 is used to execute various menus related with the operations of the digital image processing device 100 and may be used as a short-cut key. As shown, the function button 17 may include five buttons such as an up button, a down button, a left button, a right button, and a menu/OK button.

GPS satellites 200 in the constellation cooperate to provide to the GPS device 300 time information (e.g., in units of $10^{-9}$ or smaller) and three-dimensional position information (e.g., with an error of 30 m) including a latitude, a longitude, and an altitude. Example GPS satellites 200 include four precise clocks (e.g., atomic clocks or the like) having an error of 1 second per about 160,000 years.

The GPS device 300 receives and stores its GPS information, i.e., time, a latitude, a longitude, and an altitude from the GPS satellite 200 at a predetermined time intervals of, for example, 10 seconds.

In a GPS system known in the art that includes the GPS satellite constellation defined by a plurality of satellites 200 and the GPS device 300, the GPS device 300 receives position measuring radio waves, which are transmitted every second from 24 GPS satellites 200 located at an altitude of about 20,000 km around the earth, and displays its current time and position (including a latitude, a longitude, and an altitude) on a display (e.g., including a geographical map) so that its current position can be recognized in three dimensions.

The communication link 400 connects the digital image processing device 100 with the GPS device 300 via wired or wireless connection protocol so that data communication can be performed between the digital image processing device 100 and the GPS device 300. As shown in FIG. 1, the communication link 400 may be a wired connection member such as a cable, wire or the like. However, the communication link 400 may be a wireless connection such as, for example, Wi-Fi, Bluetooth, etc. As known in the art, Bluetooth provides near-distance wireless communication between devices and Bluetooth modules (e.g., transceivers) have a small size (e.g., of 0.5 square inches) and small power consumption (e.g., of 2.5 mW (based on Class 2)). Devices including a Bluetooth module can wirelessly communicate data at a speed of 1 Mbps at a near distance (e.g., of 10 to 100 m).

Figure 2:
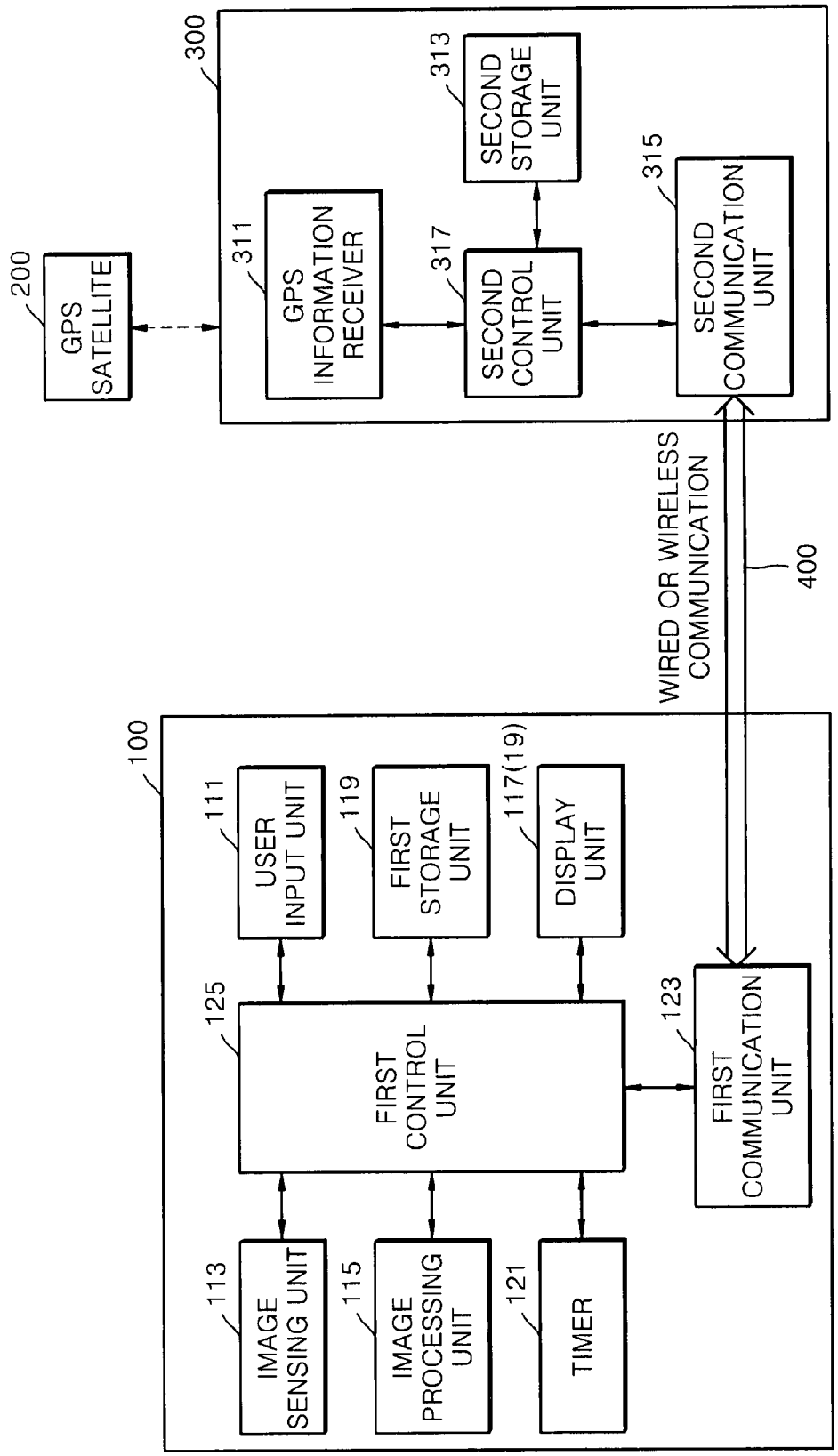
FIG. 2 is a block diagram of the system illustrated in FIG. 1.

FIG. 2 is a block diagram of the example system illustrated in FIG. 1. Referring to FIG. 2, the digital image processing device 100 includes a user input unit 111, an image sensing unit 113, an image processing unit 115, a display unit 117 (e.g., corresponding to the display unit 19 in FIG. 1), a first storage unit 119, a timer 121, a first communication unit 123, and a first control unit 125.

As can be appreciated from FIG. 1, the user input unit 111 may include the shutter-release button 11, the power button 13, the wide angle-zoom button 15W, the telephoto-zoom button 15T, and the function button 17.

The image sensing unit 113 may include various optical devices including a lens unit, an iris, a CCD, and an analog-to-digital converter (ADC). Actuation of the shutter-release button 11 adjusts the quality of exposure light with the iris. The lens unit receives light from an external light source and processes an image. The iris is opened or closed to adjust the quality of incident light. The degree of opening/closing of the iris may be controlled by the first control unit 125. The CCD accumulates light input through the lens unit and outputs an image, which is sensed by the lens unit according to the quality of the accumulated light, in synchronization with a vertical sync signal. The image acquisition of the digital image processing device 100 is carried out by the CCD which converts light reflected from a subject into an electrical signal. The ADC converts an analog image signal output from the CCD into a digital signal.

The image processing unit 115 processes a digitized image signal so that it can be displayed. Elements used in the CCD are sensitive to the changes in temperature and thus generates dark current according to changing temperature, which results in a black level in the image signal. The image processing unit 115 removes the black level caused by the dark current. In addition, the image processing unit 115 performs gamma correction. Human sight non-linearly reacts to brightness according to Weber's law. When the brightness of light is linearly recorded with a limited bit depth, posterization occurs. Accordingly, in order to provide highest picture quality at the given bit depth, it is necessary to perform coding using a non-linear function. The operation of coding information to agree with the non-linearity of human sight is referred to as gamma correction. The image processing unit 115 performs gamma correction on an input image signal using a gamma curve. For example, the image processing unit 115 corrects the input luminance level of a 12-bit image signal into the luminance level of an 8-bit image signal.

The image processing unit 115 also performs color filter array (CFA) interpolation, by which a Bayer pattern including an RGRG line and a GBGB line of gamma corrected data is interpolated by an RGB line. When the CFA interpolation of the image processing unit 115 is performed, a G channel is first restored in pixels that have only an R or B channel value and then empty values are filled in order of B and R or R and B channels. As such, three R, G, and B channels are restored. The image processing unit 115 converts interpolated RGB signals into YUV signals, performs edge compensation to sharpen an image by filtering a Y signal using a high pass filter and color correction to correct color values of U and V signals using a standard color coordinate system, and removes noise. Thereafter, the image processing unit 115 performs compression and signal processing on the noise-removed Y, U, and V signals so as to generate an Exif file (see FIG. 5) as an image file. The Exif file is displayed by the display unit 117 and stored in the first storage unit 119. Various operations of the image processing unit 115 are controlled by the first control unit 125. In addition, the image processing unit 115 may be controlled by the first control unit 125 to: insert position information received from the GPS device 300 into an image file; and then store the image file in the first storage unit 119, which will be described in detail later.

The timer 121 provides timing for various functions of the digital image processing device 100. The timer 121 may also provide current photographing time information (e.g., for time/date stamp of a photographed image) when the image processing unit 115 generates an image file.

The first communication unit 123 may be controlled by the first control unit 125 to perform data communication through the communication link 400 via wireless or wired connection protocol. The first communication unit 123 may include a wired or wireless transceiver for transmitting a time/position information request signal to the GPS device 300 and for receiving time information and position information from the GPS device 300 (e.g., in response to the time/position information request signal).

As illustrated in FIG. 2, the GPS device 300 includes a GPS information receiver 311, a second storage unit 313, a second communication unit 315, and a second control unit 317.

Various functions of the GPS device 300 are controlled by the second control unit 317. For example, the second control unit 317 may control the information receiver 311 to receive information/signals from the GPS satellites 200 at a predetermined time interval of, for example, 10 seconds so that the second control unit 317 may determine the latitude, the longitude, and the altitude of the GPS device 300.

The second storage unit 313 may be controlled by the second control unit 317 to store the time information and the position information, which may be determined with the second control unit 317 in cooperation with the GPS information receiver 311. The second storage unit 313 may store the time information and the position information at the predetermined time interval.

The second communication unit 315 may be controlled by the second control unit 317 to perform data communication through the communication link 400 via wireless or wired connection protocol. In an example, upon receiving the time/position information request signal from the digital image processing device 100, the second communication unit 315 transmits to the digital image processing device 100 via the communication link 400 the requested time information and position information stored in the second storage unit 313. In other embodiments, the second control unit 317 of the GPS device 300 may control the second communication unit 315 to transmit (e.g., continuously, periodically, etc.) the stored time information and position information in the second storage unit 313 without having received the request signal from the digital image processing device 100.

A method for inserting position information into an image according to an aspect of the present invention will be described with reference to FIGS. 3 through 6. In an embodiment of the system, the method may be performed by the digital image processing device 100. For example, a main algorithm for inserting position information into an image may be executed in the first control unit 125 in combination or cooperation with other units within the digital image processing device 100. However, in other embodiments of the system, the method may be performed by the GPS device 300 or by both of the devices 100, 300.

Figure 3:
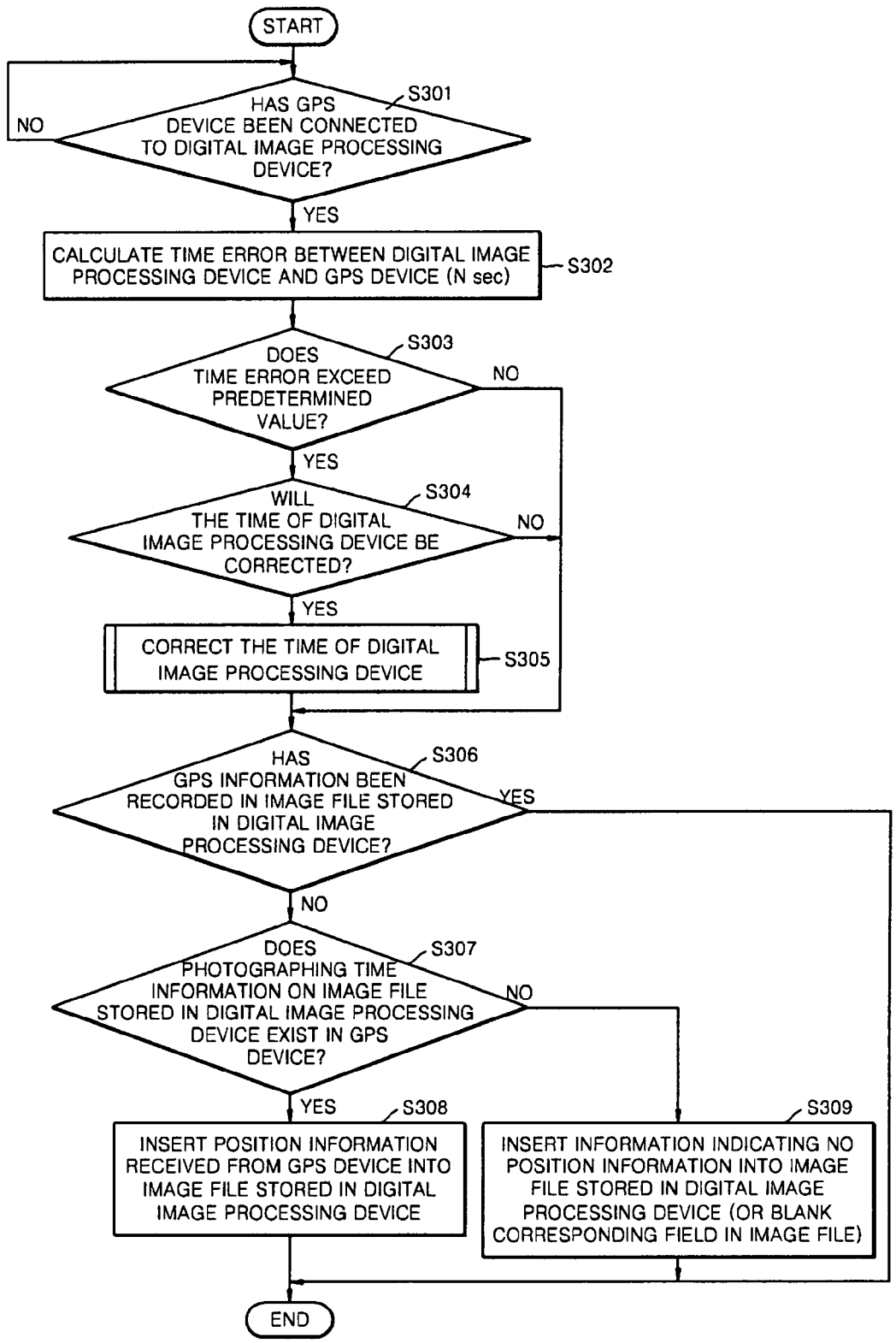
FIG. 3 is a flowchart of an example method of inserting position information into an image according to another aspect of the present invention.

FIG. 3 is a flowchart of an example method of inserting position information into an image. As can be appreciated, in the present system that does not rely on an intervening/intermediate personal computer (PC) for reconciling the stored GPS information and image files, the digital image processing device 100 and the GPS device 300 may perform data communication based on universal serial bus on-the-go (USB OTG) technology or the like to obviate using a PC.

USB OTG is an independent USB interface that allows a device configured with a USB connector/module to independently connect to another device directly (i.e., without a host of a PC) and to transmit and receive data between the devices. That is, any-to-any transmission is possible. For example, when a digital camera includes a USB OTG module having a self-hosting function, a user can directly connect the digital camera to a printer and push or transmit an image file to the printer and print out a photograph taken by the digital camera by interconnecting the camera and the printer by way of a USB cable. In other words, the USB OTG technology escapes from a PC-centered master-slave structure and provides for interfacing of digital devices, thereby increasing the usability of various devices such as personal data assistants (PDAs), mobile phones, and MP3 players.

Accordingly, at least one of the digital image processing device 100 and the GPS device 300 may include a USB port such that the devices 100, 300 can operate as a host or a target. In the current embodiment of the present invention, the digital image processing device 100 operates as a host and the GPS device 300 operates as a target. That is, the digital image processing device 100 operating the host receives (e.g., requests, pulls, etc.) position information from the GPS device 300 operating as the target and inserts the position information into an image file. In other embodiments, the host and target roles of the devices 100, 300 may be reversed. For example, the GPS device 300 may push or otherwise transmit time and position information to the digital image processing device 100 when the devices 100, 300 are interconnected.

Before the method illustrated in FIG. 3 is performed, the digital image processing device 100 and the GPS device 300 may be operated independently (e.g., so long as the devices 100, 300 are generally proximate to each other to ensure proper position information for the device 100). For example, to photograph an image, a user turns on the digital image processing device 100 and operates the device 100. The GPS device 300 may be turned on by the user before photographing. The digital image processing device 100 and the GPS device 300 need not be connected by the communication link 400 during photographing. Accordingly, the digital image processing device 100 independently photographs an image and generates and stores an image file while the GPS device 300 independently receives and stores time information and position information from the GPS satellites 200. Thereafter, when the user wants to insert the position information into the image file, the user connects the digital image processing device 100 and the GPS device 300 using the communication link 400.

In operation S301, the digital image processing device 100 determines whether the GPS device 300 has been wired or wirelessly connected to the digital image processing device 100. When the communication link 400 interconnects the digital image processing device 100 and the GPS device 300, the first control unit 125 senses the connection through the first communication unit 123.

When the GPS device 300 is connected to the digital image processing device 100 through the communication link 400, the digital image processing device 100 compares its own time information with time information transmitted from the GPS device 300 and calculates a time error in operation S302. A timer or clock (not shown) may be included in the first control unit 125 for counting the time of the digital image processing device 100. Alternatively, the timer 121 may count the time of the digital image processing device 100. In the example method, for clarity of the description, it is assumed that the timer 121 counts the time of the digital image processing device 100. The first control unit 125 compares time information provided by the timer 121 with the time information of the GPS device 300, which is received by the first communication unit 123, and calculates a time error (e.g., a difference of N sec).

In operation S303, it is determined whether the time error between the timer 121 and the GPS device 300 excesses a predetermined value. As can be appreciated, if an image is photographed by the digital image processing device 100 at the same instant that the GPS device 300 stores a position, when the time error exceeds the predetermined value, the digital image processing device 100 may not be able to reconcile/match stored position information with a corresponding image file. Accordingly, incorrect position information may be inserted into an image file. To prevent this problem, the digital image processing device 100 calculates the time error between the digital image processing device 100 and the GPS device 300. In an example embodiment, the predetermined value is set to 10 seconds and the first control unit 125 determines whether the time error between the digital image processing device 100 and the GPS device 300 exceeds 10 seconds.

When it is determined in operation S303 that the time error between the digital image processing device 100 and the GPS device 300 exceeds the predetermined value (e.g., 10 seconds), the digital image processing device 100 in operation S304 queries whether the user wants to correct the time of the device 100 (e.g., the timer 121).

In operation S305, the digital image processing device 100 corrects the time of the timer 121 (e.g., upon receiving a time correction signal).

Figure 4:
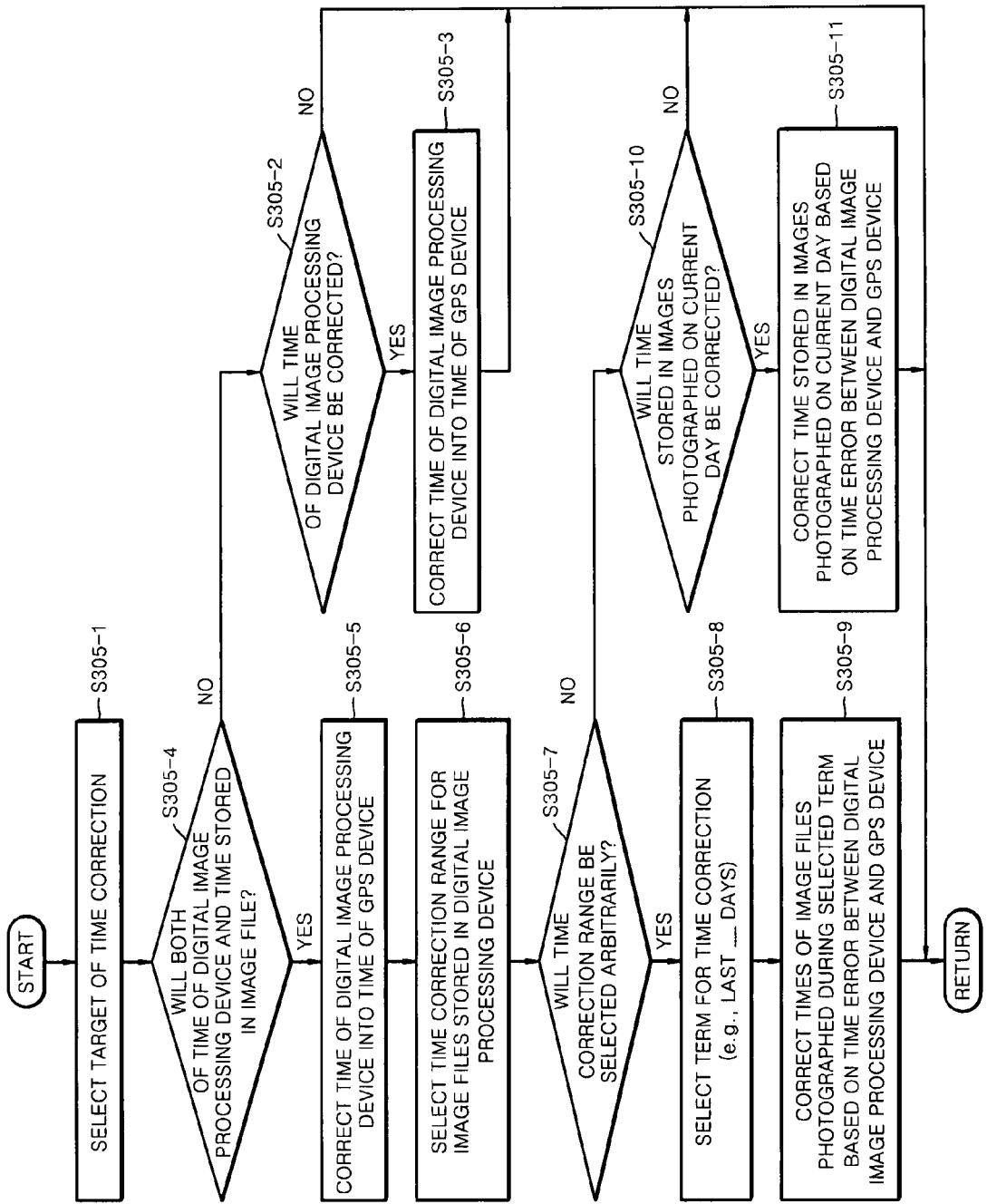
FIG. 4 is a flowchart of a method of correcting time of a digital image processing device in the method illustrated in FIG. 3.

FIG. 4 is a flowchart of an example method of correcting the time, which may be performed by the digital image processing device 100. The digital image processing device 100 can correct its time in two ways: 1) by correcting only the time of the digital image processing device 100; and 2) by correcting the time of the digital image processing device 100 and a photographing time of a stored image file, i.e., a time recorded in a stored image file. The method in which the digital image processing device 100 corrects its time will now be described in detail with reference to FIG. 4.

In operation S305-1, the digital image processing device 100 displays a menu for time correction and waits to receive a signal relative to actuation of an input by the user for selecting a target of time correction. Here, the first control unit 125 receives the time correction signal and displays a time correction target selection menu on the display unit 117. The time correction target selection menu may include a first sub-menu for correcting only the time of the digital image processing device 100 and a second sub-menu for correcting both of the time of the digital image processing device 100 and a photographing time recorded in a stored image file.

In operation S305-4, the digital image processing device 100 determines whether a signal for correcting both of the time of the digital image processing device 100 and a photographing time recorded in a stored image file has been received. If the device 100 does detect such a signal, the method proceeds to operation S305-5. However, if the device 100 does not detect such a signal, the method proceeds to operation S305-2.

In operation S305-2, the digital image processing device 100 determines whether a signal for correcting the time of the digital image processing device 100 has been received.

When it is determined that the signal for correcting the time of the digital image processing device 100 has been received, the digital image processing device 100 in operation S305-3 corrects its time to agree with the time of the GPS device 300. As previously described, the GPS satellites 200 provide very precise time, and thus the GPS device 300, which receives signals from the GPS satellites 200, also provides precise time. Accordingly, the first control unit 125 corrects its time into the time received from the GPS device 300.

At operation S305-4, when it is determined that the signal for correcting both of the time of the digital image processing device 100 and a photographing time recorded in a stored image file has been received, the digital image processing device 100 in operation S305-5 first corrects its time according to the time of the GPS device 300. Thereafter, in order to correct times recorded in image files stored in the digital image processing device 100, the digital image processing device 100 receives a term (i.e., range of days, times, etc.) selecting signal from the user in operation S305-6. For this operation, the first control unit 125 may display on the display unit 117 one or more sub-menus that indicate, for example: 1) a first sub-menu that queries a user's arbitrary selection of the correction term; and 2) a second sub-menu that queries the user's correction of a specified selection of the correction term (e.g., the times of image files photographed on a current day).

In operation S305-7, it is determined whether a signal for arbitrarily selecting the correction term with respect to the image files stored in the digital image processing device 100 has been received from the user.

In operation S305-7, when it is determined that the signal for arbitrarily selecting the correction term has been received, the digital image processing device 100 queries and waits to receive the correction term (e.g., last _ days) from the user in operation S305-8.

After the correction term is set, the digital image processing device 100 in operation S305-9 corrects times recorded in image files stored during the correction term based on the time error between the digital image processing device 100 and the GPS device 300, which is calculated in operation S302. For instance, when the correction term is set to "last 5 days", the first control unit 125 corrects photographing times recorded in image files that have been photographed and stored in the first storage unit 119 during the last 5 days, based on the current time error between the digital image processing device 100 and the GPS device 300.

Alternatively, in operation S305-7, when it is determined that the signal for arbitrarily selecting the correction term has not been received, the method proceeds to operation S305-10. In operation S305-10, it is determined whether a signal for correcting times of image files photographed and stored on the current day has been received.

When it is determined that the signal for correcting the times of image files photographed and stored on the current day has been received, the digital image processing device 100 in operation S305-11 corrects the photographing times of the image files photographed and stored on the current day based on the time error between the digital image processing device 100 and the GPS device 300, which is calculated in operation S302.

Referring back to FIG. 3, after the time correction is completed in operation S305, the digital image processing device 100 determines in operation S306 whether position information received from the GPS device 300 has already been inserted in one or more of the stored image files in order to search for image files in which position information has not been recorded since it is not necessary to insert the position information into image files in which the position information has already been recorded.

In operation S307, the digital image processing device 100 determines whether photographing time information of each image file, in which the position information has not been recorded, exists in the GPS device 300. In operation S307, when it is determined that the photographing time information of the image file, in which the position information has not been recorded, exists in the GPS device 300, the digital image processing device 100 in operation S308 receives position information corresponding to the photographing time information on the image file from the GPS device 300 and inserts the position information into the image file.

Although it is preferable that the digital image processing device 100 receives the position information corresponding to the photographing time information on the image file from the GPS device 300 and inserts the position information into the image file, the photographing time of the image file in the digital image processing device 100 may not exist or otherwise be correctly matched/reconciled with the position information stored in the GPS device 300. For example, when image files are photographed and stored by the digital image processing device 100 while the GPS device 300 is not operated (or when the device 300 cannot communicate with satellites 200), time information and position information for those image files do not exist in the GPS device 300. Furthermore, the GPS device 300 receives and stores position information from the GPS satellite 200 at a predetermined time interval (e.g., at an interval of 10 seconds). However, photographing time of the digital image processing device 100 may be different (e.g., due to an uncorrected time error that is greater than a predetermined value) from a time when the GPS device 300 receives position information from the GPS satellite 200. For example, when the photographing time of an image file in the digital image processing device 100 is 17:55:11, the position information reception time of the GPS device 300 is 17:55:15, and GPS device 300 receives position information at a time interval of 10 seconds, the photographing time of the digital image processing device 100 is different from the position information reception time of the GPS device 300. At this time, position information corresponding to photographing time information on the image file stored in the digital image processing device 100 does not exist in the GPS device 300, and thus in such instances position information cannot be inserted into the image file. In this case, the first control unit 125 of the digital image processing device 100 may receive position information corresponding to a time closest to the photographing time from the GPS device 300 and insert the position information into the image file. In the above example, position information corresponding to 17:55:15 which is closest to the photographing time 17:55:11 may be received and inserted into the image file photographed at 17:55:11. Alternatively, the first control unit 125 may employ an interpolation-type algorithm to determine a position based on two adjacent positions that were stored at different times (e.g., two sequential times). Additionally, the first control unit 125 may receive position information before or after the photographing time from the GPS device 300 and insert the position information into the image file.

Figure 5:
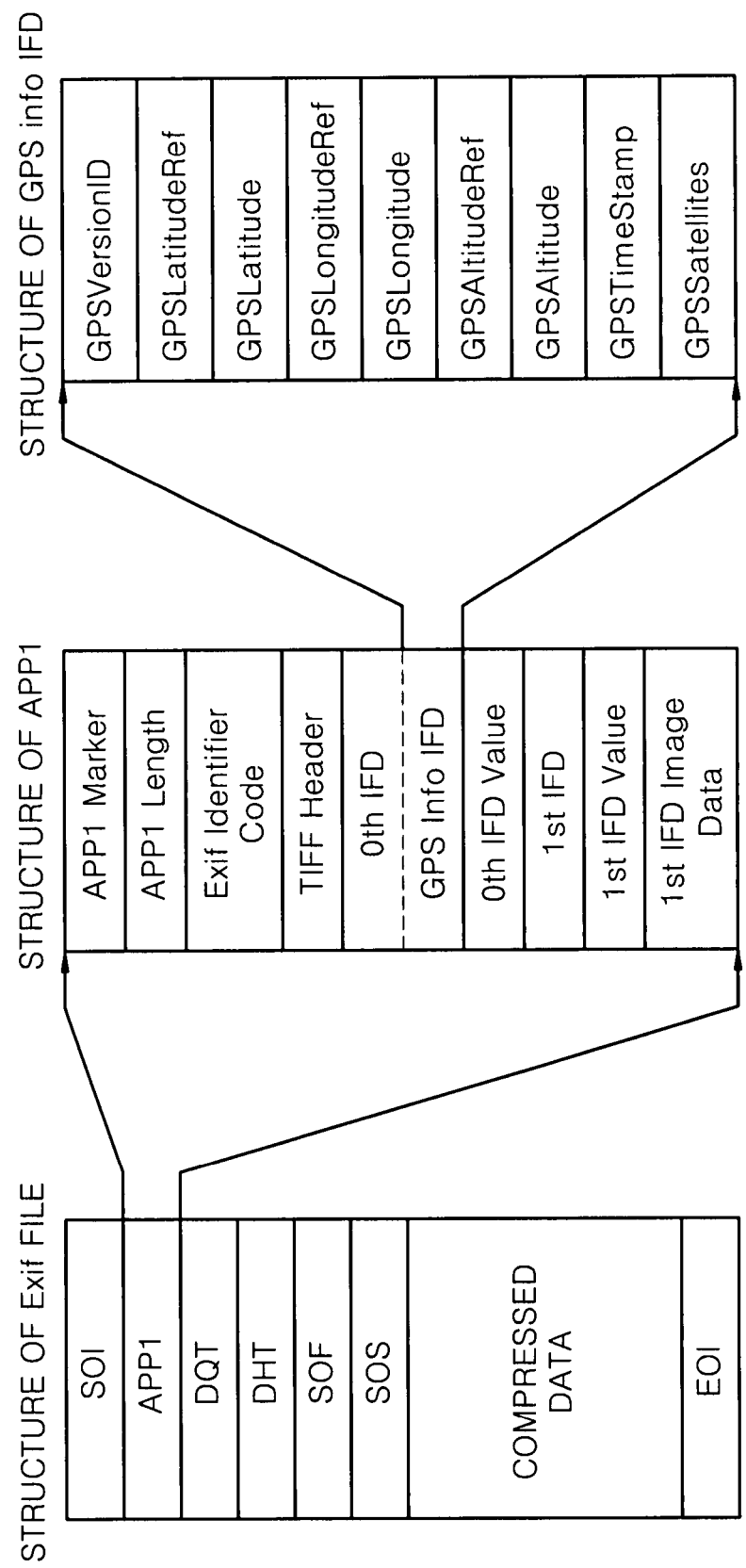
FIG. 5 illustrates the structure of an image file into which position information is inserted.

FIG. 5 illustrates the structure of an example image file into which position information is inserted. FIG. 5 illustrates the structure of an Exif file generated by the image processing unit 115 according to the control of the first control unit 125. In an application marker segment1 (APP1) portion of the Exif file, a date on which compressed image data was photographed, additional information such as a product name, or thumbnail information is recorded. FIG. 5 also illustrates the structure of the APP1 portion. In the APP1 portion, a 0th image file directory (IFD) field includes a GPS info IFD field. The first control unit 125 stores position information received from the GPS device 300 in the GPS info IFD field. FIG. 5 also illustrates the structure of the GPS info IFD field. The GPS info IFD field includes a GPS version, a GPS latitude, a GPS longitude, a GPS altitude, a GPS timestamp, and satellite information, which are received from the GPS device 300.

When it is determined that the photographing time information of each image file, in which the position information has not been recorded, does not exist in the GPS device 300, the digital image processing device 100 may: 1) insert information indicating that no position information exists into the image file: or 2) blank a corresponding field in the image file in operation S309. Sometimes, the GPS device 300 cannot communicate with the GPS satellites 200. For instance, when the GPS device 300 is located under the ground or within a building that hinders communication with the GPS satellites 200, the GPS device 300 cannot communicate with the GPS satellites 200. In this case, the GPS device 300 cannot receive position information from the GPS satellites 200 and thus, position information is not recorded in the second storage unit 313 of the GPS device 300. Accordingly, there is no position information for an image file that is photographed and generated in this situation, and therefore, the digital image processing device 100 inserts information indicating no position information into the image file or blanks a corresponding field in the image file.

FIGS. 6A through 6G illustrate example menus, which may be displayed on the display unit 117 of the digital image processing device 100 when position information is inserted into an image file stored in the digital image processing device 100.

Figure 6A:
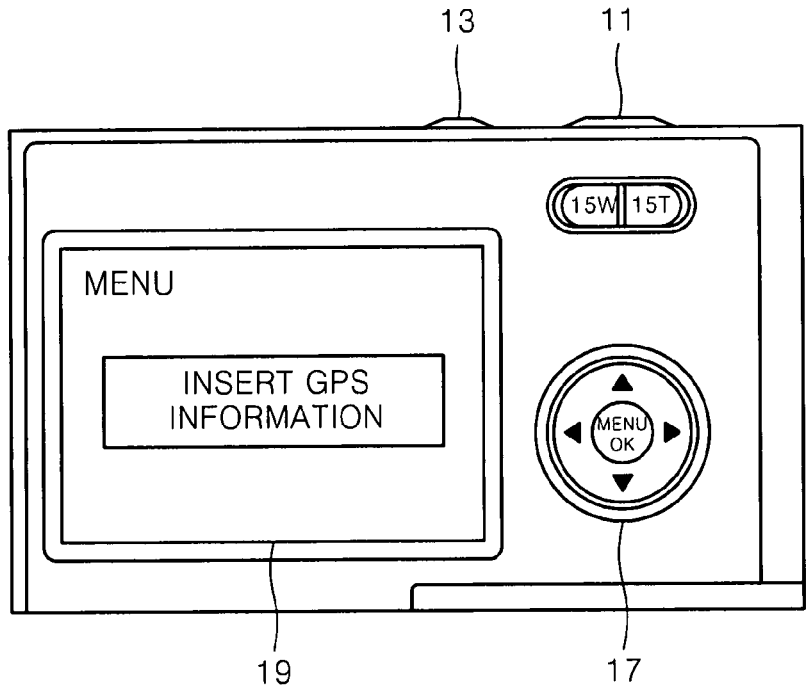
FIGS. 6A through 6G illustrate example menus, which are displayed on an image processing device when position information is inserted into an image.

FIG. 6A illustrates an "Insert GPS information" menu which is displayed on the display unit 19 (FIG. 1) to prompt a user for inserting position information received from the GPS device 300 into an image file stored in the digital image processing device 100.

Figure 6B:
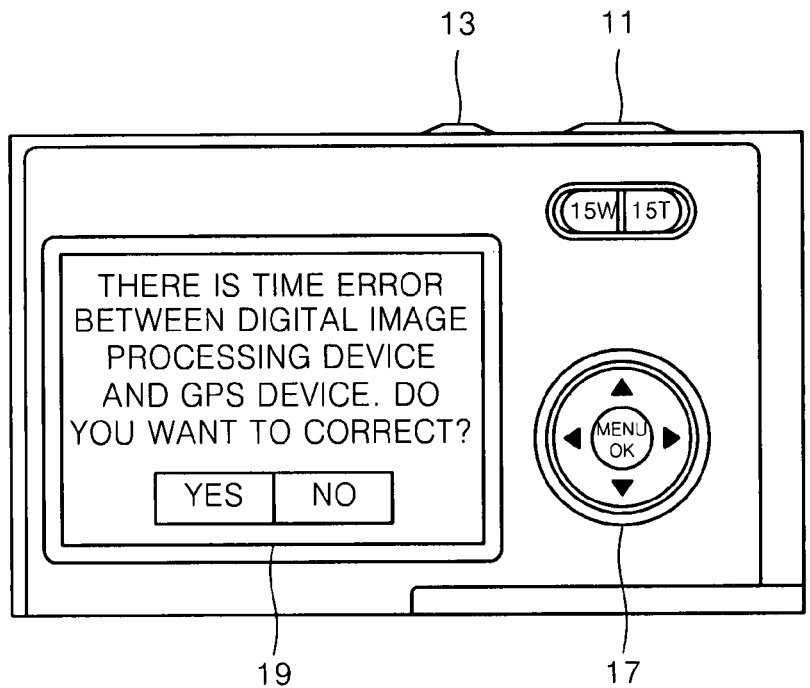

FIG. 6B illustrates a menu which is displayed relative to operation S304 (FIG. 3) to query whether a user wants to correct the time of the digital image processing device 100 when the time error between the digital image processing device 100 and the GPS device 300 is calculated after the selection of the "Insert GPS information" menu (FIG. 6A).

Figure 6C:
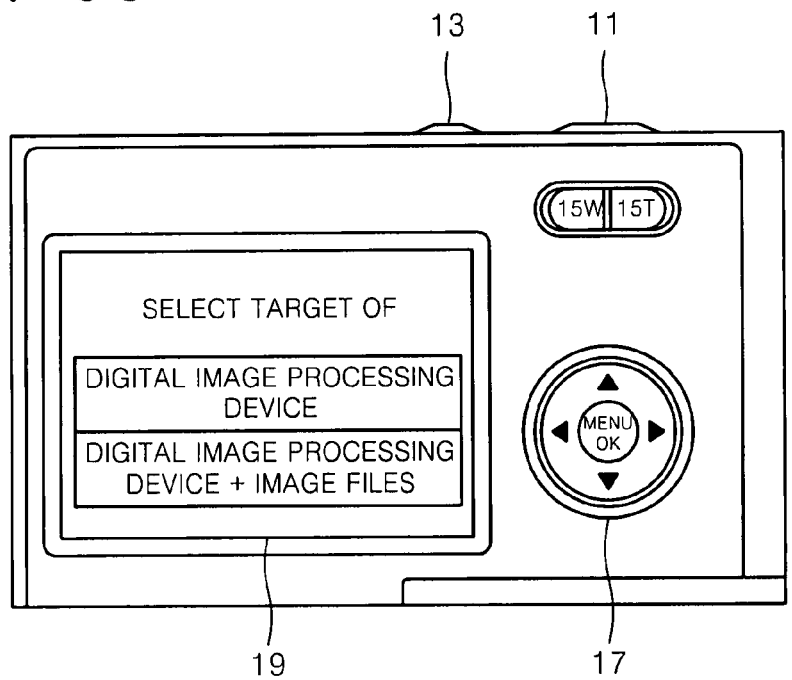

FIG. 6C illustrates sub-menus, which are displayed relative to operation S305 (FIG. 3) to allow the user to select: 1) the correction of only the time of the digital image processing device 100; or 2) the correction of both of the time of the digital image processing device 100 and photographing time of image files stored in the digital image processing device 100 (e.g., when the user selects "YES" on the menu illustrated in FIG. 6B).

Figure 6D:
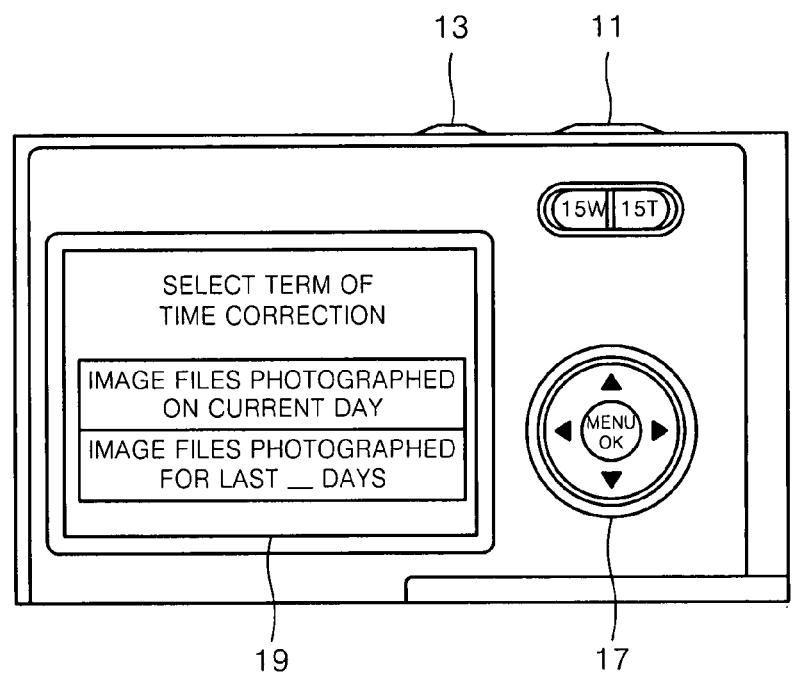

FIG. 6D illustrates sub-menus, which are displayed relative to operations S305-7 and S305-10 to allow the user to select the correction of photographing time of image files photographed on a current day or the correction of photographing time of image files photographed for last _ days, when the user selects the sub-menu for the correction of both of the time of the digital image processing device 100 and photographing time of image files stored in the digital image processing device 100 among the sub-menus illustrated in FIG. 6C.

Figure 6E:
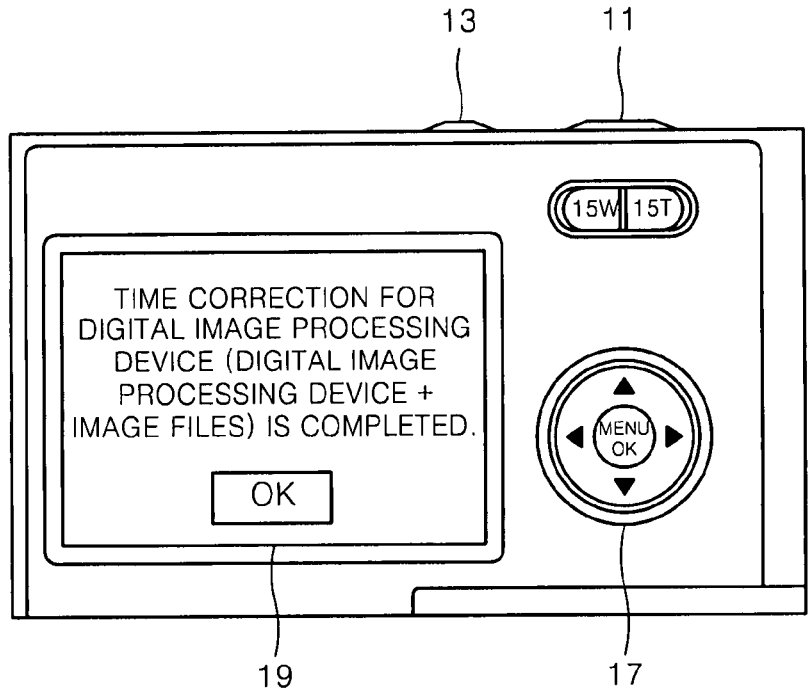

FIG. 6E illustrates a menu which shows a result of correcting the time (relative to operations S305-9 and/or S305-11) of the digital image processing device 100 and/or photographing time of image files stored in the digital image processing device 100.

Figure 6F:
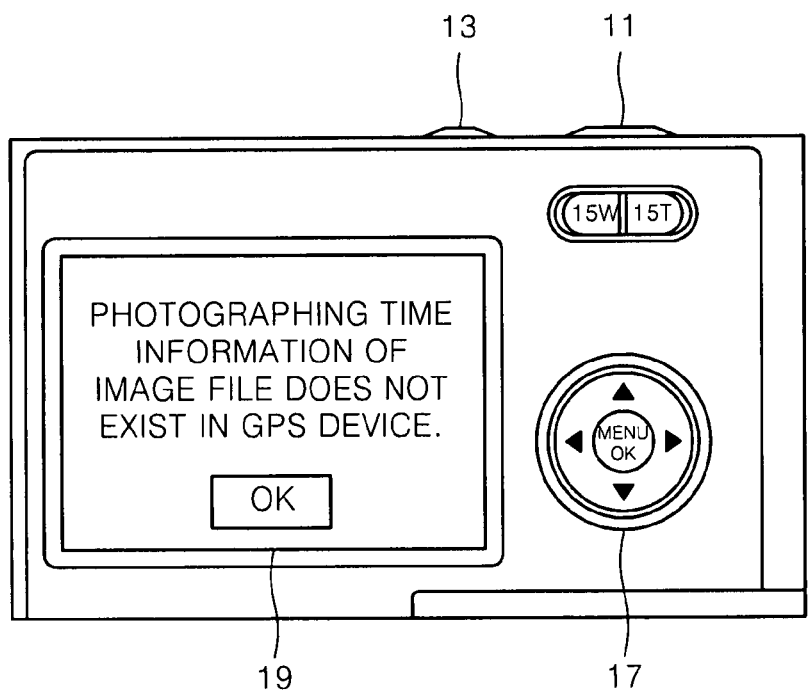

FIG. 6F illustrates a menu which indicates, relative to operation S309, that photographing time information on an image file does not exist in the GPS device 300. In this case, the first control unit 125 inserts information indicating no position information into the image file or blanks a corresponding field in the image file.

Figure 6G:
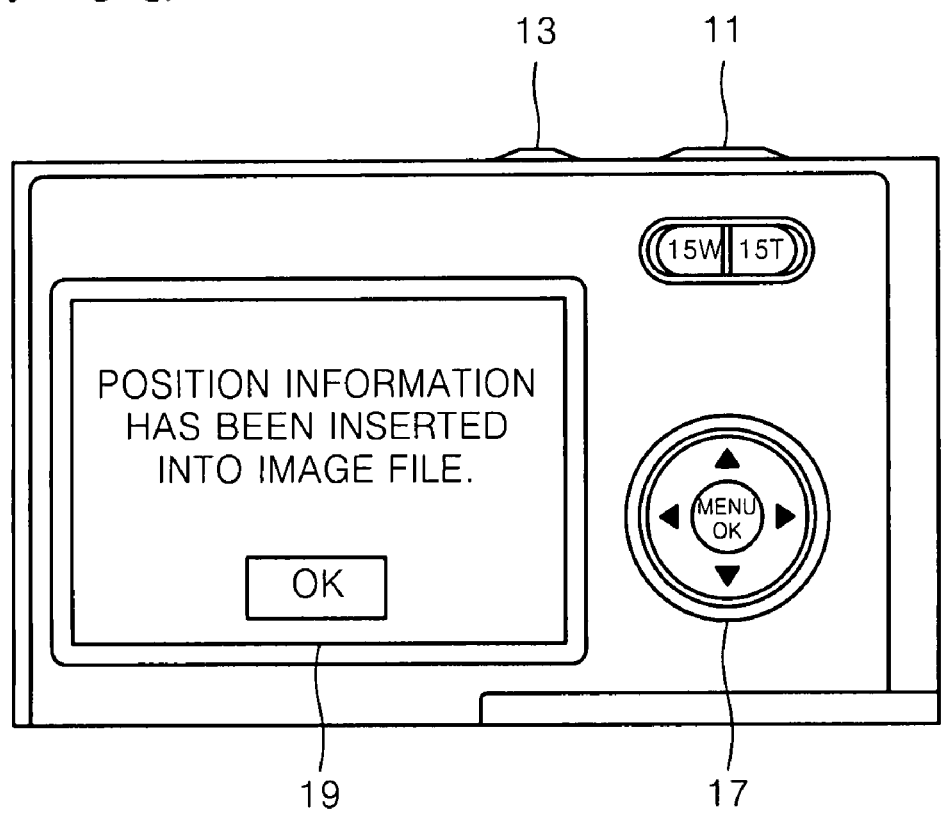

FIG. 6G illustrates a menu which indicates, relative to operation S308, that position information received from the GPS device 300 has been inserted into an image file.

As described, after image photographing by a digital image processing device and position information storing by a GPS device are separately performed, the digital image processing device and the GPS device are interconnected so that position information in the GPS device is inserted into an image file stored in the digital image processing device. According to the present system and method, initial time taken to prepare for photographing is decreased and photographing can be performed efficiently. In addition, since the GPS device not integral/unitary with the digital image processing device, the size and the power consumption of the digital image processing device can be decreased. Furthermore, since position information can be inserted into an image without using a PC equipped with special software, the present invention provides convenience for users. Also, since the time of the digital image processing device can be corrected into the time of the GPS device, accurate position information can be recorded in an image.

While the present system and method has been particularly shown and described with reference to various embodiments, it will be understood by those skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A system for inserting position information into an image file, the system comprising:
   a digital image processing device that photographs an image, generates the image file relative to the image and stores the image file, comprising a timer that provides a clock time, the timer further providing photographing time information for storing in the image file when the image file is generated; and
   a GPS device that stores position information and associated time information according to a predetermined time interval for a plurality of positions,
   wherein:
   when the digital image processing device and the GPS device are interconnected, the digital image processing device receives the position information from the GPS device, reconciles the position information for the plurality of positions with the plurality of image files according to time information in the image file, and stores the position information into the image files;
   the digital image processing device further comprises:

a processing unit that determines a time error between the clock time of the timer and time information of the GPS; and a user selector for selecting between a first option and a second option when the time error exists, wherein in the first option, the processing unit is configured to correct the clock time of the digital image processing device according to the time information of the GPS device, and in the second option, the processing unit is configured to correct the time information of the image files according to the time information of the GPS and to store the position information corresponding to the corrected time information in the image files.

2. The system of claim 1 further comprising a communication link that interconnects the digital image processing device and the GPS device.

3. The system of claim 2 wherein the communication link comprises a wired or wireless connection.

4. The system of claim 3 wherein the communication link is a wired connection including a USB OTG module.

5. The system of claim 3 wherein the communication link is a wireless connection defined by a Bluetooth protocol.

6. The system of claim 1, wherein the processing unit is configured to correct the clock time according to the time information of the GPS device when the time error exceeds a predetermined value.

7. The system of claim 6, wherein the processing unit is further configured to correct the photographing time information stored in the image file according to the time information of the GPS device when the time error exceeds the predetermined value.

8. The system of claim 1, wherein the digital image processing device and the GPS device are not connected when the digital image processing device photographs, generates, and stores the image file.

9. The system of claim 8, wherein the digital image processing device reconciles a plurality of previously captured image files at one time.

10. The system of claim 1, further comprising a further user selector for selecting a correction term that defines a time range of image file times to which time correction should be applied.

11. A method of inserting position information stored in a GPS device into image files stored in a digital image processing device that photographs an image, the method comprising:

periodically storing position information and associated time information according to a predetermined time interval by the GPS device for a plurality of positions;

determining whether the digital image processing device and the GPS device are interconnected; and when the digital image processing device and the GPS device are determined to be interconnected, transmitting position information for the plurality of positions that corresponds to photographing times of the plurality of image files from the GPS device to the digital image processing device;

storing the position information into the image files;

selecting between a first option and a second option, wherein:

the first option comprises correcting the clock time of the digital image processing device according to the time information of the GPS device; and the second option comprises correcting the time information of the image files according to the time information of the GPS and storing the position information corresponding to the corrected time information in the image files.

12. The method of claim 11 further comprising the step of establishing a connection between the digital image processing device and the GPS device.

13. The method of claim 12 wherein the establishing step comprises connecting the digital image processing device and the GPS device with a cable.

14. The method of claim 12 wherein the establishing step comprises setting-up a wireless communication link between the digital image processing device and the GPS device.

15. The method of claim 14 wherein the wireless communication link is defined by Bluetooth protocol.

16. The method of claim 11, wherein the transmitting step further comprises synchronizing the digital image processing device with the GPS device.

17. The method of claim 16, wherein the synchronizing step comprises:

determining a time error between a timer of the digital image processing device and a timer of the GPS device;

comparing the time error to a predetermined value; and if the time error is greater than the predetermined value, adjusting the timer of the digital image processing device according to the time error.

18. The method according to claim 11, further comprising:

capturing a plurality of images and associated data without a connection of the digital image processing device and the GPS device, wherein the determining of the interconnection occurs after the plurality of images and associated data have been captured.

19. The method according to claim 11, further comprising:

determining if there is no GPS time information corresponding to the time information of one of the image files; and correcting the position information of one of the image files with position information associated with a closest GPS time available.

20. A digital photographing system for inserting position information into image files, the system comprising:

a digital camera including an image memory configured to store a plurality of image files, each having an image timestamp;

a GPS receiver including a position memory configured to store position information along with a position timestamp for a plurality of positions; and a selectively-establishable communication link configured to directly interconnect the digital camera and the GPS receiver, wherein:

upon establishing the communication link, the digital camera reconciles the image timestamps and position timestamps to match the plurality of positions and the plurality of image files the digital camera further comprises:

a processing unit that determines a time error between the clock time of a timer and time information of the GPS, a user selector for selecting between a first option and a second option when the time error exists, wherein in the first option, the processing unit corrects the clock time of the digital image processing device according to the time information in the GPS device, and in the second option, determines a time range of the image file for the time error that is to be corrected, and corrects the time information of the image file that is included in the time range based on the time error according to the time information of the GPS, and stores the position information corresponding to the corrected time in the image file.

21. The digital photographing system of claim 20 wherein the selectively-establishable communication link comprises at least one of a wired and wireless connection.

* * * * *